Sept. 29, 1942.  P. SACKS ET AL  2,297,076
BRAKE CONTROLLING MECHANISM FOR AUTOMOBILES
Filed July 5, 1940
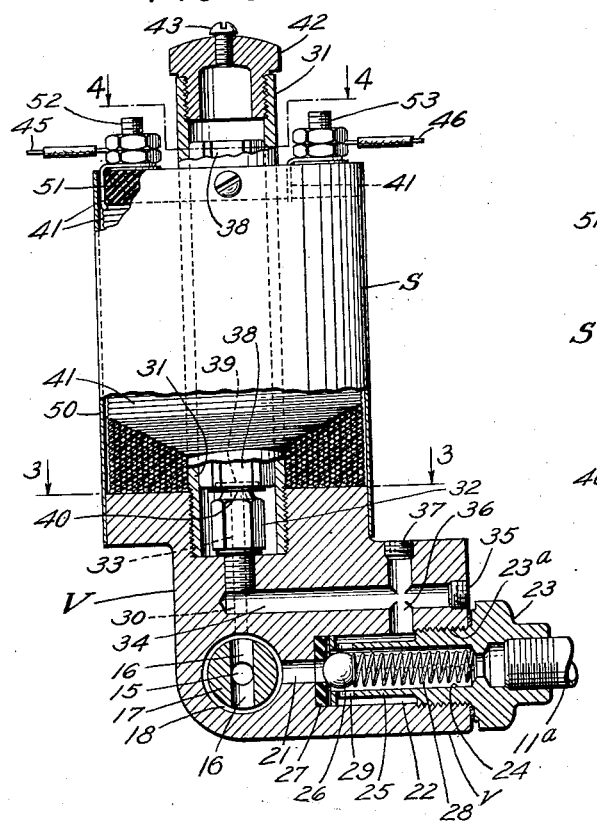
Inventors
Philip Sacks
Marion M. McCoy
By Leonard E. Fischer
Attorney Patented Sept. 29, 1942

2,297,076

UNITED STATES PATENT OFFICE 2,297,076

BRAKE CONTROLLING MECHANISM FOR AUTOMOBILES

Philip Sacks, Newark, and Marion M. McCoy, Whippany, N. J.

Application July 5, 1940, Serial No. 343,924

4 Claims. (Cl. 137—139)

This invention relates to controlling means for hydraulic brakes of automobiles and it has as its primary object to provide new and improved mechanism, independent of the brake and clutch pedals and wholly under the control of the operator, for maintaining the brakes set whenever it is desired to prevent the automobile from moving under the force of gravity and for subsequently releasing the brakes without shock, jar or noise.

Devices of this nature are particularly useful in preventing automobiles, which have been brought to rest on a hill, from starting to coast either forward or backward during the interval of time between the removal of the operator's foot from the brake pedal and the initiation of the power drive of the automobile under the influence of the foot-controlled accelerator.

A number of devices of this general nature heretofore have been provided but insofar as we are aware none has been entirely satisfactory. Some have been effective only when the automobile is facing an up-grade. Others have been connected to and actuated by parts of the automobile which are manipulated more or less constantly during the operation of the automobile, such for example as the clutch pedal and the accelerator pedal, whereas the brakes usually are required to be locked only infrequently. Those prior devices therefore have been subjected to excessive and unnecessary actuation and wear.

Other prior constructions have been actuated and maintained effective by power supplied by the running of the automobile engine. Those devices have been somewhat unreliable in that stopping or stalling of the engine renders the brake-locking device ineffective, whereupon the brakes are released inadvertently.

Still others have been controlled electrically, but the electrically controlled devices have been complicated in design and have been so constructed that the high braking pressure (frequently in the neighborhood of 500 pounds per square inch) is released almost instantaneously, with the result that the whole braking system is subjected to shocks and jars which are detrimental to the parts and which produce undesirable noise.

This invention has as an object to provide a brake-controlling mechanism, the use of which is optional with the operator, which will effectively maintain the brakes set as long as desired, and which is devoid of all the undesirable and objectionable features of prior constructions.

Another object of the invention is to provide a simplified brake-controlling mechanism of this nature which is actuated by a constantly available source of power entirely independent of and separate from the automobile engine.

Still another object is to provide an improved brake-controlling mechanism wholly under the control of the operator, to be actuated only when needed, and which to operate will not require the operator to assume any awkward or unnatural position, his hands and feet being maintained in the same positions in which they would be located if the brake-controlling mechanism were not embodied in the automobile.

These objects have been attained by the provision of a brake-controlling mechanism including an improved and simplified check-valve unit located in the fluid-return line, which, at certain times, prevents the return of the fluid from the individual brake-actuating cylinders. The present improved construction also includes actuating means for said check-valve comprising an electric solenoid, adapted to be energized by electric current from the storage battery of the automobile and a manually actuable control switch in series with said battery and solenoid for rendering said solenoid selectively effective or ineffective to close said check-valve. This control switch is preferably located on the gear-shifting lever of the automobile, where the operator normally has his right hand when preparing to start his automobile.

A still further object of the invention is to provide an improved and simplified quick-locking and gradual-releasing solenoid-actuated check-valve adapted to be embodied as a unit in a conventional hydraulic brake system of an automobile to control the locking and releasing of the brakes, as hereinbefore described.

Other objects and advantages will be in part indicated in the following description and in part rendered apparent therefrom in connection with the drawing, depicting a preferred typical construction, which has been annexed as a part of this disclosure and in which:

Fig. 1 is a side elevation, partly in section, of our improved electric solenoid-actuated check-valve unit adapted to be used in a hydraulic brake-system.

Fig. 2 is view similar to Fig. 1, but taken at right angles thereto.

Fig. 3 is a transverse sectional view taken substantially on the line 3—3 of Fig. 1.

Fig. 4 is a transverse sectional view taken on the line 4—4 of Fig. 1.

Referring more specifically to the drawing, the invention is disclosed as embodied in a solenoid actuated and manually controlled check-valve designed to be incorporated in the main conduit of a conventional hydraulic brake system of an automobile between the cylinder of the usual pressure producing hydraulic pump, actuated by the brake-pedal and the branch conduits which extend to the individual brake-actuating cylinders. Under normal operating conditions of the automobile this check-valve is ineffective and permits unrestricted flow through the conduits in both directions, thereby permitting normal applying and releasing of the brakes under the influence of the usual brake-pedal. When it is desired to lock the brakes in applied position, the solenoid, which forms a part of the check-valve, is energized by being electrically connected with the usual storage battery of the automobile by the manual actuation of a suitable switch located convenient to the hand of the driver, as for example on the gear-shift lever. This energizing of the solenoid closes the check-valve and thereby prevents return flow of oil from the individual brake-actuating cylinders, whereupon each of the brakes is maintained locked. The brakes will remain locked until the solenoid is de-energized by opening of the electric circuit, whereupon the check-valve will open and permit return flow of the brake-actuating oil.

As shown in the drawing, this check-valve comprises a valve casing V connected to the discharge end of the cylinder C by a threaded adapter 14 provided with an axial bore 15 (see Fig. 2), radial ducts 16, and a reduced cylindrical portion 17 affording an annular chamber 18 between the portion 17 and the surrounding portion of the valve casing V. The valve casing is clamped upon the adapter 14 between a shoulder 19 formed thereon and a clamp nut 20 threaded upon the outer end of the adapter (see Fig. 2), suitable washers being interposed between the surfaces to form oil-tight joints. The valve casing V is preferably made of cast iron or some other highly magnetic metal.

Formed in the valve casing V, at a right angle to the bore 15 and communicating at one end with the annular chamber 18, is a bore 21, the other end of which communicates with an enlarged bore 22 formed in an extension v of the valve casing V. This bore is threaded at its outer end and receives the correspondingly threaded portion 23ª of a bushing 23 into the outer end of which is threaded a conduit 11ª which is connected with each of the four brake-actuating cylinders, not shown. The bushing 23 has a central bore 24 and a reduced portion 25 which serve as a retainer for a ball check-valve 26, designed to bear upon a seat or washer 27, fitted in the bore 22 adjacent the bore 21, under the influence of a compression spring 28 located in the bore 24. Radial ports 29 connect the bore 24 with the bore 22 for a purpose later to be described.

Extending upwardly through the valve casing V, and communicating at their lower ends with the annular chamber 18, are two relatively small ducts 30 (see Figs. 2 and 3), the upper ends of which terminate in the lower end of an upright tube 31, preferably of brass or other non-magnetic metal, later to be described. Threaded into the valve casing intermediate the ducts 30 is a nipple 32 having a central bore 33 of small diameter. The relatively small diameters of the ducts 30 and the bore 33 are an important feature of this invention as later will be explained. The upper end of the nipple is located within the lower end of the tube 31 and is formed as a valve-seat which is normally engaged gravitationally by a valve washer which closes the upper end of the bore 33 for a purpose later to be described. At its lower end the bore 33 communicates with a horizontal bore 34 formed in the valve casing above and parallel to the bores 21 and 22. A plug 35 closes the outer end of the bore 34 which, intermediate its ends, is intersected by a vertically disposed bore 36 through which it communicates with the bore 22 adjacent the reduced portion 25 of the bushing 23. The outer end of bore 36 is closed by a plug 37.

Bearing in mind that the entire system is filled with oil, and ignoring for the present a brake-locking device which forms another feature of this invention, it will be understood that when the brake pedal is depressed sufficient oil will be forced through the valve-casing V to shift the brake-actuating pistons in the four brake-actuating cylinders, thereby to apply the brakes. The degree to which the brakes will be applied will be proportional to the amount of pressure applied to the brake-pedal, as is usual in hydraulic brake systems.

As the brake-pedal is depressed oil is forced from the cylinder C through bore 15, ducts 16, chamber 18, through bore 21, shifting the ball valve 26 in opposition to the spring 28 thereby removing the ball from its seat 27, thence through bore 24 to conduit 11ª. When pressure on the brake-pedal is relieved the brake-actuating pistons in the brake cylinders will retract, thereby forcing a portion of the oil in conduit 11ª to return to the valve-casing V. The returning oil will flow from conduit 11ª into bore 24 but, as the ball-valve 26 is then in contact with its seat 27, the oil may not flow through conduit 21. Instead, the oil flows outwardly from bore 24 through ducts 29, thence through bore 22, duct 36, bore 34, bore 33, downwardly through ducts 30 to chamber 18 from whence it may flow back to cylinder C through radial ducts 16 and horizontal bore 15.

The foregoing describes the operation of our system when our improved locking device therefor is not in use. This improved locking device is adapted to prevent return flow of fluid from the brake cylinders when pressure on the brake-pedal is relieved and comprises a check-valve adapted to be rendered effective at will whenever the ignition switch is closed and the brakes are applied. This locking device comprises a valve adapted to be controlled by a solenoid, designated generally as S, which is supported upon the valve casing V and which includes a core 38 slidingly mounted in the upright tube 31 having one end threaded into the valve casing. At its lower end the core 38 carries a washer 39 adapted normally to rest by gravity upon a seat 40 at the upper end of the nipple 32, to close the bore 33 therein. The solenoid S further consists of a wire coil 41 wrapped about the tube 31 and which, when energized by a flow of electricity therethrough, draws the core 38 downwardly thereby forcing the washer 39 onto the seat 40 with sufficient pressure to withstand the back pressure in the system. The coil 41 is encased within a sheet metal sheath or casing 50 secured at its lower end to the valve casing V and carrying within its upper end a block 51 of insulating material, such as fibre, in which are secured non-magnetic binding posts 52 and 53 connected to opposite ends of the coil. The nuts threaded on the binding posts also are made of non-magnetic metal, such as brass. The upper end of the tube 31 is closed by a non-magnetic cap 42 which carries a threaded non-magnetic screw 43 adapted to be unscrewed and serve as a vent to bleed the system of air after it has been installed, thereby to insure that the entire system will be filled with oil. To permit oil to flow to the upper end of the tube 31, so that there will be no tendency to create a vacuum at that point when the core 38 is moved downwardly, the core is preferably made of hexagonal stock as shown most clearly in Fig. 4. Spaces 44 are afforded between the outer hexagonal periphery of the core 38 and the inner circular wall of the tube 31 and those spaces permit free flow of oil in the tube as the core moves therein.

The coil 41 is preferably connected with the usual storage battery and in series with the conventional ignition system of the automobile. One end of the coil 41 is connected to the ignition system back to the ignition switch by a wire 45, connected to the binding post 52, so that the coil may be energized only when the ignition switch is closed. The other end of the coil, attached to binding post 53, is connected to ground through a wire 46 connected to a suitable manual control switch, not shown, which also is grounded. Thus it will be understood that when the ignition switch is closed the coil 41 will be energized and the core will be pulled downwardly closing the bore 33 in nipple 32 with sufficient pressure to prevent return flow of fluid in the brake system.

Although the hydraulic pressure in brake actuating systems, as above described, frequently reaches 500 pounds per square inch that pressure is readily resisted by the pull of the solenoid which uses only about 2 amperes at 6 volts. This is made possible largely by the small diameter of the bore 33 which, in actual practice is only about $\frac{3}{32}$ of an inch, as are also the ducts 30. The efficiency of the solenoid also is increased by reason of the fact that the valve casing V, being of magnetic metal, becomes magnetized by the flow of current through the coil 41 and attracts the core 38 and thereby helps to force the washer 39 onto the seat 40, whereas the tube 31, cap 42, screw 43, binding posts 52, 53 and the nuts thereon, being of non-magnetic metal, do not become energized and therefore do not exert any counter-pull on the core.

It will readily be understood that if such pressure were released instantly, upon opening of the switch 47, the parts would be subjected to severe shocks and jars which would not only be detrimental to the parts but which also would cause undesirable noise. This sudden release, with the accompanying undesirable results, also have been eliminated by making the bore 33 of relatively small diameter, as above described. Due to its diameter this bore so restricts the flow of oil that the brakes are released gradually and all shocks, jars and noise and sudden retraction of the brake-pedal are eliminated. The ducts 30, being two in number and of substantially the same diameter as the bore 33, insure that there will be no restricting back pressure on the fluid after it has passed the valve seat 40.

The nipple 32 is threaded into the valve casing V and may be removed and replaced by a similar nipple having a bore of different diameter whenever it is desired to adapt the unit for any special working conditions.

Another important feature of this invention resides in the fact that the core of the solenoid does not have any appreciable axial movement under the influence of the magnetic coil 41 and therefore is entirely noiseless in its action. The only time at which the core is raised off of the seat 40 is when the oil is returning through bore 33. Oil in the upper end of the tube 31 cushions the core in its upward movement. When this flow stops the core and the washer 39 carried thereby are again lowered by gravity onto the seat 40. When the coil is energized the core merely bears more firmly on the seat 40 without any preceptible endwise movement.

Having thus described our invention, we claim:

1. A control unit for a hydraulic brake system having a pressure-producing means and fluid actuated brakes, comprising a casing having an inlet adapted to be connected with the pressure-producing means and an outlet adapted to be connected with said brakes, a tube threaded into said casing transversely of said inlet and outlet, a by-pass from said outlet to said inlet to permit return flow of fluid through said casing, a control valve embodied in said by-pass, comprising a valve seat, a core movable in said tube and a washer carried by said core and normally resting on said valve seat, and a magnetic coil surrounding said tube and adapted when energized to cause said core to be urged in one direction to force said washer against said valve seat, thereby to prevent return flow of fluid through said by-pass.

2. A control unit for a hydraulic brake system having a pressure-producing means and fluid actuated brakes, comprising a casing having an inlet adapted to be connected with the pressure-producing means and an outlet adapted to be connected with said brakes, a tube secured in said casing transversely of said inlet, a by-pass from said outlet to said inlet to permit return flow of fluid through said casing, a control valve embodied in said by-pass, comprising a valve seat, a core movable in said tube and a washer carried by said core and normally resting by gravity on said valve seat, a cap closing the upper end of said tube, an air vent in said cap, and a magnetic coil surrounding said tube and adapted when energized to cause said core to be urged in one direction to force said washer onto said valve seat to prevent return flow of fluid in said system.

3. A control unit for a hydraulic brake system having a pressure-producing means and fluid actuated brakes, comprising a casing having an inlet adapted to be connected with the pressure-producing means and an outlet adapted to be connected with said brakes, a cylindrical tube secured in said casing, a by-pass from said outlet to said inlet to permit return flow of fluid through said casing, a control valve embodied in said by-pass, comprising a valve-seat, a core movable in said tube and having one end normally resting on said valve-seat, said core being of polygonal form in cross section, the spaces between the sides of said core and the inner wall of said tube permitting the flow of fluid lengthwise of said tube, and a magnetic coil surrounding said tube and adapted when energized to cause said core to be urged against said valve seat to prevent return flow of fluid in said system.

4. A control unit for a hydraulic system having a pressure-producing means and fluid actuated brakes, comprising a casing of magnetic metal having an inlet adapted to be connected with the pressure-producing means and an outlet adapted to be connected with said brakes, a tube of non-magnetic metal secured in said casing transversely of said inlet, a by-pass from said outlet to said inlet to permit return flow of fluid through said casing, a control valve embodied in said by-pass comprising a valve seat, a core movable in said tube and a washer carried by said core and normally resting by gravity on said valve seat, a non-magnetic cap closing the upper end of said tube, an air vent in said cap, a magnetic coil surrounding said tube and adapted when energized to cause the combined magnetic forces set up in said coil and valve casing to urge said core in one direction to force said washer onto said valve seat with sufficient pressure to prevent return flow of fluid in said system.

PHILIP SACKS.
MARION M. McCOY.